United States Patent [19]

Herrmann

[11] Patent Number: 5,628,677
[45] Date of Patent: May 13, 1997

[54] APPARATUS FOR MACHINING GLASS

[76] Inventor: Heinz Herrmann, Leipziger Strasse 105, D-47918 Tönisvorst, Germany

[21] Appl. No.: 683,229

[22] Filed: Jul. 18, 1996

[30] Foreign Application Priority Data

Jul. 20, 1995 [DE] Germany .................. 295 11 748.6

[51] Int. Cl.⁶ .................. B24B 7/00; B24B 9/00
[52] U.S. Cl. .................. 451/231; 451/178; 451/412
[58] Field of Search .................. 451/41, 231, 412, 451/257, 178; 83/169

[56] References Cited

U.S. PATENT DOCUMENTS

| 8,323 | 8/1851 | Colne | 451/41 |
|---|---|---|---|
| 2,526,423 | 10/1950 | Rudorff | 451/231 |
| 2,598,405 | 5/1952 | Marchand | 451/231 |
| 3,421,265 | 1/1969 | Parachek | 451/231 |
| 4,423,568 | 1/1984 | Gould | 451/178 |
| 4,516,357 | 5/1985 | Gach | 451/231 |
| 4,551,948 | 11/1985 | Kindig et al. | 451/231 |
| 5,549,509 | 8/1996 | Hirst et al. | 451/178 |

*Primary Examiner*—James G. Smith
*Assistant Examiner*—Derris H. Banks
*Attorney, Agent, or Firm*—Herbert Dubno; Andrew Wilford

[57] ABSTRACT

An apparatus for machining glass has a housing forming an upwardly open water-holding reservoir, a horizontal screen forming a support surface and covering the housing, a drive motor in the housing having an output shaft extending upward through the screen, and a drive wheel on the output shaft above the screen. A mount on the housing at the screen is releasably secured to a machine base that carries a glass-machining tool releasably connected to the wheel.

9 Claims, 2 Drawing Sheets

APPARATUS FOR MACHINING GLASS

FIELD OF THE INVENTION

The present invention relates to an apparatus for machining glass. More particularly this invention concerns a machine for beveling or cutting glass as for the production of tiffany-style glass articles.

BACKGROUND OF THE INVENTION

In the production of tiffany-style lamps and the like it is necessary to accurately cut small pieces of glass and to finish and bevel the edges of the pieces thus cut. A commercial shop has different tools such as described in my earlier patents 4,991,471 and 5,207,030 as well as in my copending application 08/435,173 for performing the various tasks. A standard bevel grinder, for instance, comprises a housing forming an upwardly-open water-holding reservoir with a screen forming a support surface over the water and forming a support surface. The grinding tool is mounted on the screen and works on pieces of glass that are set directly on the screen.

For the home handyman it is often necessary to do many of the operations manually, as the cost of the various power tools is excessive. Thus producing a piece of ornamental glass work is an extremely laborious and time-consuming job.

OBJECTS OF THE INVENTION

It is therefore an object of the present invention to provide an improved apparatus for machining glass.

Another object is the provision of such an improved apparatus for machining glass which overcomes the above-given disadvantages, that is which is adaptable to different glass-machining tasks.

SUMMARY OF THE INVENTION

An apparatus for machining glass has according to the invention a housing forming an upwardly open water-holding reservoir, a horizontal screen forming a support surface and covering the housing, a drive motor in the housing having an output shaft extending upward through the screen, and a drive wheel on the output shaft above the screen. A mount on the housing at the screen is releasably secured to a machine base that carries a glass-machining tool releasably connected to the wheel.

Thus it is possible to change the base and its tool, substituting for example a rotary polishing disk for a band saw. The drive motor, housing, screen, and mount are used with all the tools so the user need merely change the tool when the task changes. The individual tool assemblies are relatively simple and inexpensive, and changeover from one tool to another can be a straightforward operation.

According to the invention the wheel is formed as a pulley and the apparatus further comprises a flexible endless belt connecting the pulley to the tool. To accommodate tools that need to operate at different speeds the wheel is formed with at least two offset grooves of different diameter each capable of receiving the belt. Thus a simple one-speed drive motor can be used. When a variable-speed drive motor is used it is possible for the wheel to be a gear wheel with teeth.

The mount according to the invention is formed by a plurality of pins projecting upward through the screen. These pins can be simple threaded studs that fit through holes in the tool base so nuts hold down the base. According to another feature of the invention a sponge set in the screen has a lower surface immersed in a body of water in the reservoir and an upper surface engaging the tool.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
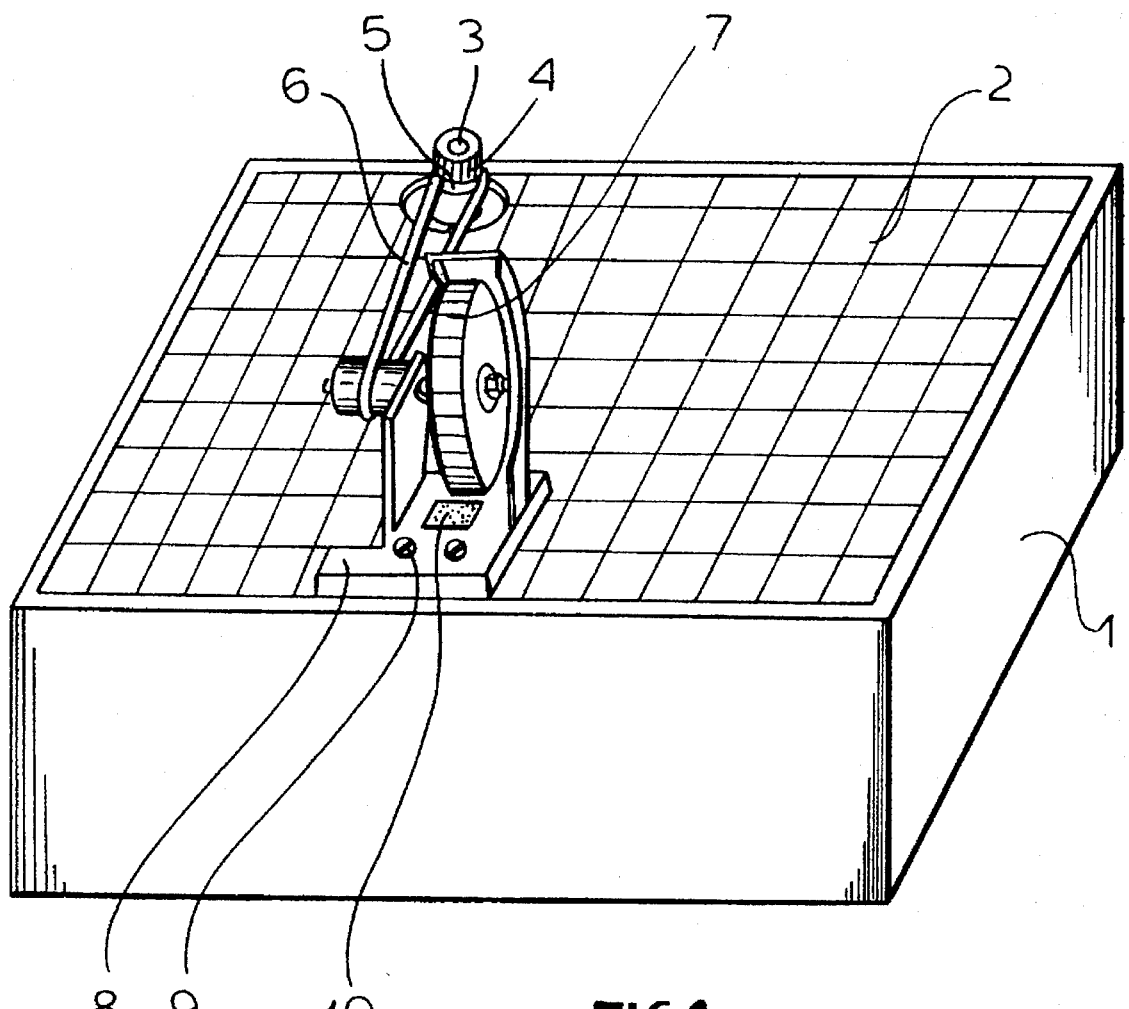
FIG. 1 is a small-scale partly diagrammatic perspective view of the apparatus according to the invention set up as a polisher.
Figure 3:
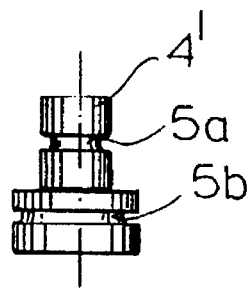
FIG. 3 is a side view of the drive wheel.
Figure 4:
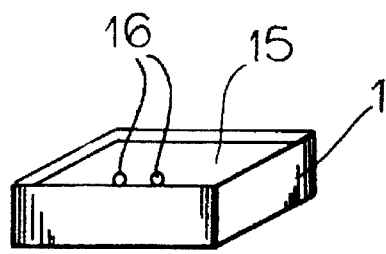
FIG. 4 is a small-scale view of the housing/reservoir of the apparatus.
Figure 5:
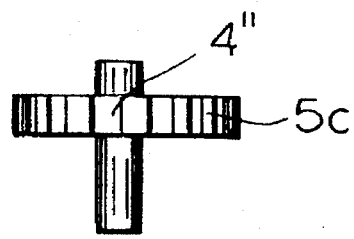
FIG. 5 is a side view of another drive wheel.

As seen in FIG. 1 a glass-polishing apparatus according to this invention has a housing 1 basically formed as an upwardly open box capable of holding a body of water 15 (FIG. 4) and having a stiff screen 2 forming a horizontal support surface at its upper side. A shaft 3 of an unillustrated drive motor received in the housing 1 projects up through the screen 2 and carries a drive wheel 4 formed with a groove 5 to constitute a pulley. FIG. 3 shows how a wheel 4' may have sections of different diameter formed with respective grooves 5a and 5b allowing different drive ratios, and FIG. 5 shows a drive wheel 4" having gear teeth 5c.

A belt 6 reeved over the wheel 4 operates a polishing wheel 7 rotatable about a horizontal axis and carried on a base 8 sitting on the screen 2. As seen in FIG. 4 the base 1 has upstanding threaded studs 16 that project through the base 8 so that threaded nuts 9 fitted to the studs 16 can hold this base solidly in place. A sponge 10 fitted in the base 8 has a lower surface engaging the body 15 of water in the housing 1 and an upper surface that engages the tool 7 and/or the workpiece being polished by the tool 7.

Figure 2:
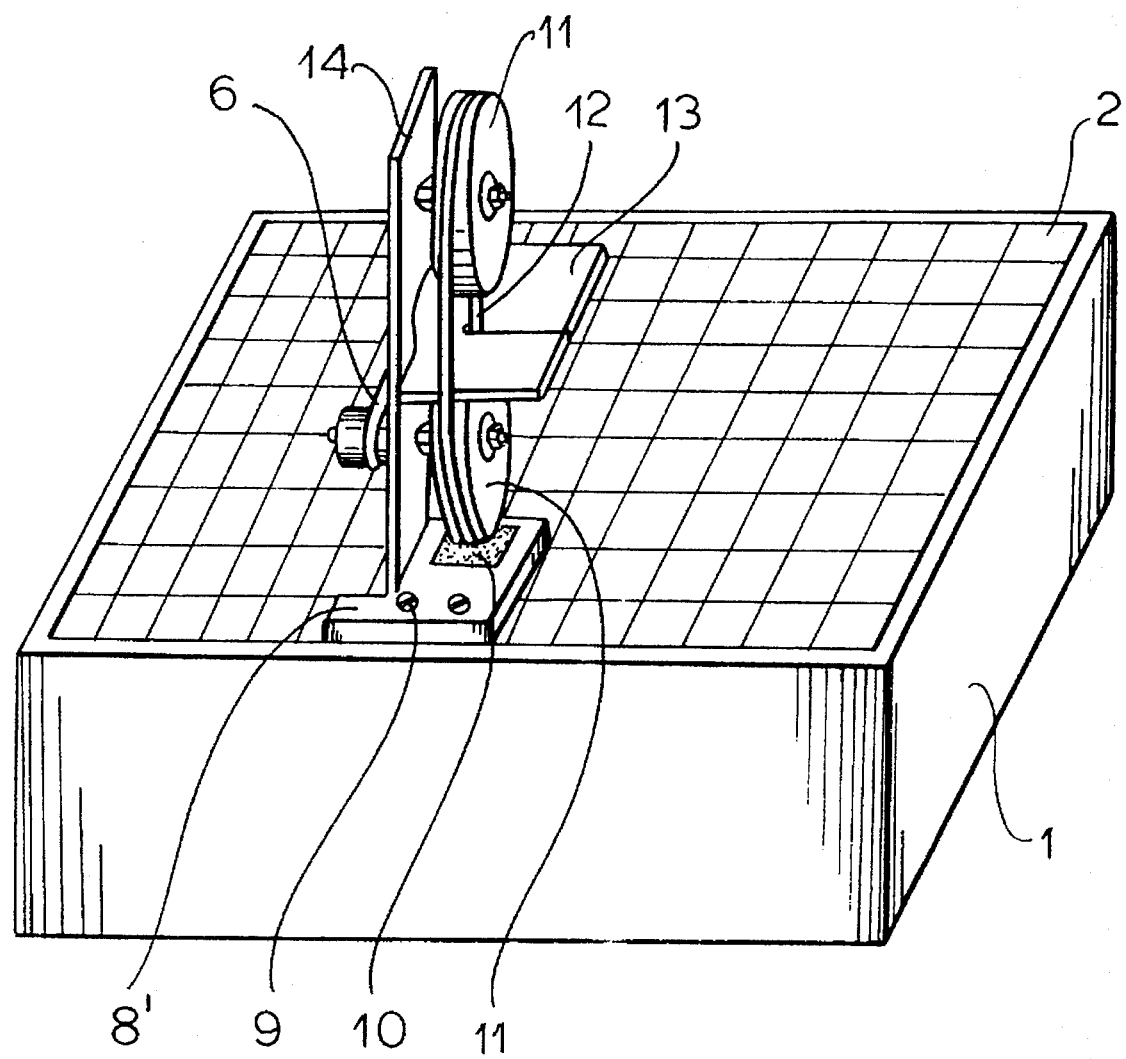
FIG. 2 is the apparatus set up as a band saw.

In FIG. 2 a different base 8' identically secured to the screen 2 and having a sponge 10 has an upright 14 on which are mounted vertically spaced wheels 11 over which is spanned an endless band-saw blade 12. The lower wheel is driven through the belt 6 from the drive wheel 4. A table 13 carried on the upright 14 supports the glass being cut and the blade 12 is lubricated and cooled as it passes at the bottom of its travel over the sponge 10.

I claim:

1. An apparatus for machining glass, the apparatus comprising:

a housing forming an upwardly open water-holding reservoir;

a horizontal screen forming a support surface and covering the housing;

a drive motor in the housing having an output shaft extending upward through the screen;

a drive wheel on the output shaft above the screen;

a mount on the housing at the screen;

a machine base;

means releasably securing the base on the screen at the mount; and a glass-machining tool mounted on the base and releasably connected to the wheel.

2. The glass-machining apparatus defined in claim 1 wherein the glass-machining tool is a rotary polishing disk.

3. The glass-machining apparatus defined in claim 1 wherein the glass-machining tool is a saw.

4. The glass-machining apparatus defined in claim 3 wherein the saw has an endless band blade.

5. The glass-machining apparatus defined in claim 1 wherein the wheel is formed as a pulley and the apparatus further comprises a flexible endless belt connecting the pulley to the tool.

6. The glass-machining apparatus defined in claim 5 wherein the wheel is formed with at least two offset grooves of different diameter each capable of receiving the belt.

7. The glass-machining apparatus defined in claim 1 wherein the wheel is a gear wheel with teeth.

8. The glass-machining apparatus defined in claim 1 wherein the mount is formed by a plurality of pins projecting upward through the screen.

9. The glass-machining apparatus defined in claim 1, further comprising a sponge set in the screen and having a lower surface immersed in a body of water in the reservoir and an upper surface engaging the tool.

* * * * *